Feb. 5, 1957  B. OLCOTT  2,780,069
ELECTROMAGNETIC ENERGY CONVERTER FOR A HEAT PUMP
Filed March 18, 1954
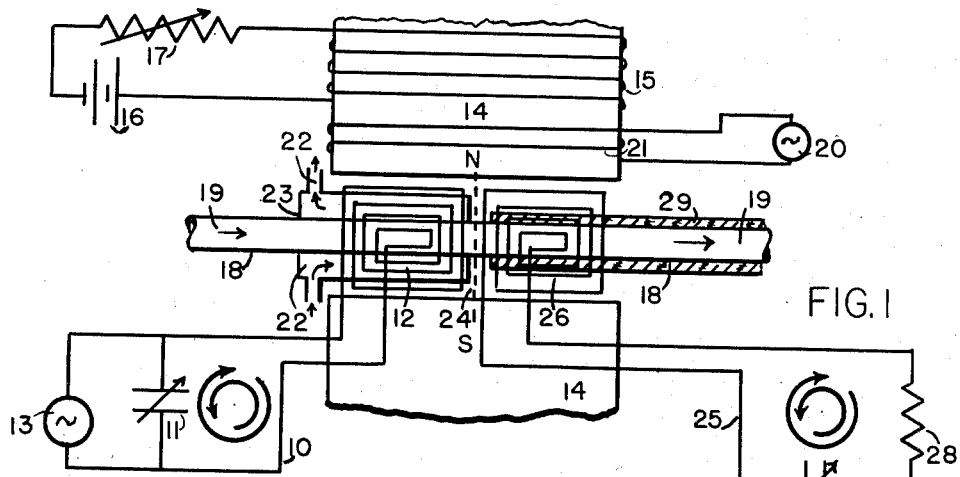
FIG. 1
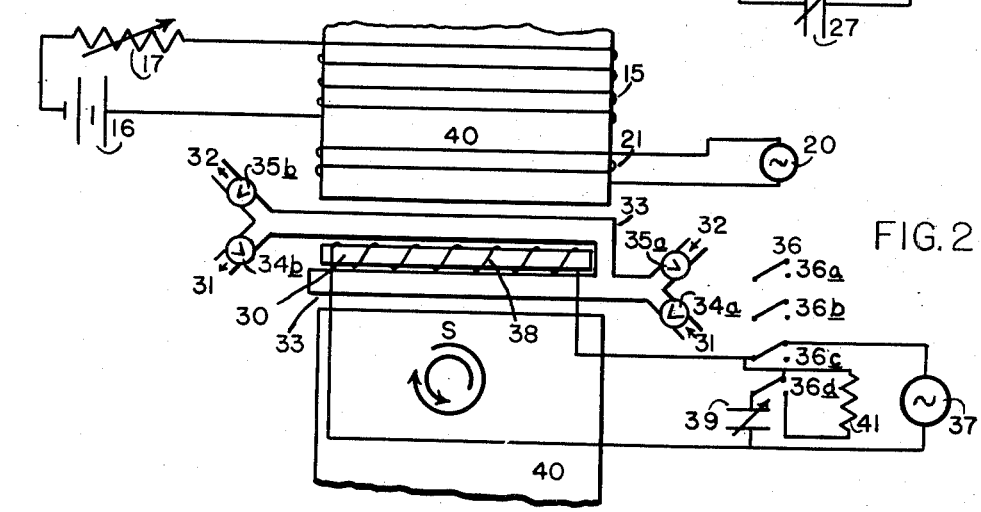
FIG. 2
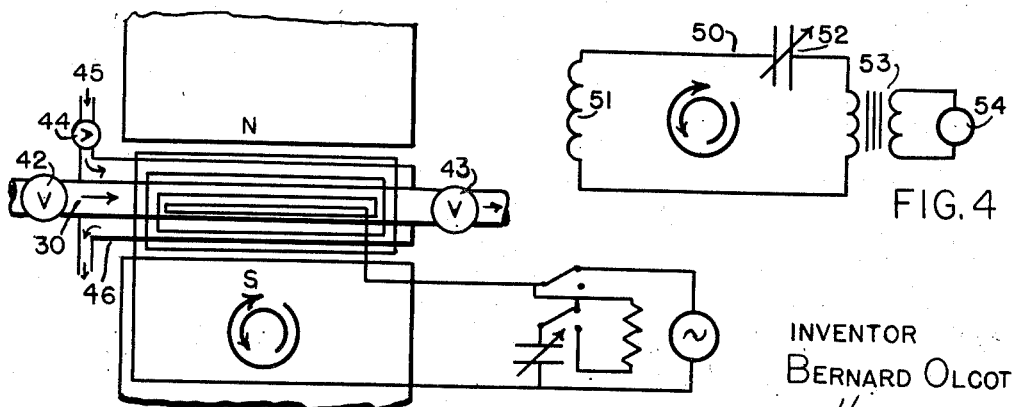
FIG. 3
FIG. 4
INVENTOR
BERNARD OLCOTT
BY Herbert J. Brown
atty United States Patent Office 2,780,069
Patented Feb. 5, 1957

2,780,069

ELECTROMAGNETIC ENERGY CONVERTER FOR A HEAT PUMP

Bernard Olcott, Fort Worth, Tex.

Application March 18, 1954, Serial No. 417,086

12 Claims. (Cl. 62—1)

This invention relates to heat pumps as employed in refrigeration systems and more particularly to a new energy converter as a component part thereof for supplying energy to the refrigeration cycle. This application is a continuation in part of my copending application, Serial No. 306,277, filed August 25, 1952, now abandoned.

An object of this invention is to provide a new energy converter component of a heat pump for producing a refrigeration effect by reducing the internal kinetic energy of the electron spin within a medium through the use of magnetic and electromagnetic fields.

A particular object of the invention is to improve the efficiency, and reduce weight and high maintenance cost ordinarily present in heating and cooling systems employing motor driven compressors and the like, as well as to eliminate objectionable noise and vibration associated with such refrigeration systems.

Another object of this invention is to provide an energy converter to convert some of the internal energy removed from the medium during the cooling phase into useful work.

Still another object of the invention is to provide an improved refrigeration means for obtaining extremely low temperatures in highly insulated cabinets.

The invention utilizes the inherent kinetic energy of the electron spin within the medium acted upon, and has to do with aligning the corresponding spinning electrons into similar phase relationship whereby the same energy of spin may be controlled for decreasing the temperature of the medium.

The alkali metals, such as sodium and potassium, are dissolvable in liquid ammonia and certain other solvents such as methylamine, ethylenediamine and diphenyl picryl hydrazyl and dissociation into positive metal ions and electrons accompanies such a process. The metallic ions have the noble gas configuration and can not exhibit paramagnetic absorption. However, the electron "gas" thus formed in the solution can respond to paramagnetic resonance techniques for changing the electron spin energy. In the presence of a constant magnetic field, the spinning electron will precess at a frequency as determined by the formula:

Frequency$=2.8 \times H \times 10^6$ (for free electron spin where $G=2$) in which H is the field strength in gauss.

When a solution of an alkali metal in liquid ammonia is polarized by a constant magnetic field of 17.5 gauss and a radio frequency field of 49 megacycles is applied at right angles to the polarized field, absorption of energy will occur at this precessional frequency with attendant increase in kinetic energy. This increase in kinetic energy is manifested as increase in temperature. The process can be made approximate isothermal by providing a cooling bath of constant temperature to remove the generated heat. When the frequency of the R. F. field is at resonance, that is, equal to the precessional frequency, a large number of spinning electrons precess in identical phase relationship. If the phase of the applied R. F. field is changed by 180° before the "in phase" relationship degenerates to random, the energy of the precessing electrons will be given up to the electromagnetic field and the energy can be dissipated in an external circuit. Fundamentally, an electrical charge moving in phase with an applied field will absorb energy and speed up while this same charge moving out of phase with an applied field will give up energy and will slow down. The decrease in internal kinetic energy will produce a lowering in temperature. Paramagnetic resonance will also occur for other specific combinations of frequency and field strength in accordance with the above mentioned formula, for example, 19 megacycles and 6.7 gauss, 1000 megacycles and 358 gauss, 9,230 megacycles and 3,300 gauss and 23,500 megacycles and 8,500 gauss.

These and other objects of the invention will become apparent from the following description and the accompanying drawings, wherein:

Figure 1 is a schematic diagram of a preferred embodiment of the invention wherein refrigeration is produced by magnetic and electromagnetic actions upon a steady flow of the liquid medium.

Figure 2 is a schematic diagram of another embodiment of the invention wherein refrigeration is produced by magnetic and electromagnetic actions upon a stationary mass of liquid medium.

Figure 3 is a schematic diagram of another embodiment of the invention wherein refrigeration is produced by magnetic and electromagnetic actions upon an intermittent flow of the liquid medium.

Figure 4 is a schematic diagram of a circuit means for utilizing a portion of the internal kinetic energy released as usable energy when the invention is used for producing refrigeration.

A schematic diagram of an electronic heat pump embodying the features of the invention is shown in Figure 1 wherein the values herein are exemplary, and wherein an aligning circuit 10 includes a resonant tank circuit consisting of a tunable condenser 11 and inductance coil 12 upon which are impressed an R. F. or microwave signal from signal generator 13. The signal generator and resonant circuit are tuned to a frequency of 49 megacycles. The coil 12 is positioned so that its electromagnetic field is perpendicular to the polarizing field produced by the electromagnet 14 which is energized by field coil 15 and battery 16 and controlled by rheostat 17. The excitation to the magnet is adjusted to produce a field strength of 17.5 gauss. A glass tube 18 containing a flowing solution 19 of sodium in liquid ammonia, concentration 0.1 M per liter of liquid ammonia, allows the solution to flow in the region of the presence of both fields. With the magnitudes stated, absorption of R. F. power by the precessing electrons will occur. However, since the absorption phenomenon is very sharp with regard to frequency and field strength, a sweeping component is added to the direct field by means of low frequency voltage source 20 and excitation coil 21 to provide for the effects of the field inhomogeneities. The absorption of R. F. power by the precessing electrons will tend to elevate the temperature of the solution and a cooling bath 22 circulated in the glass cooling jacket 23 takes away the heat produced so as to maintain approximately an isothermal process. During this isothermal process a large quantity of spinning electrons are forced into an "in phase" relationship with respect to the orbit of the precessional movement. The flow of the solution 19 is regulated so that the solution is under the aligning influence for a length of time greater than the spin-lattice relaxation time $T_1$ to permit thermal equilibrium. The solution 19 is then flowed beyond the electrostatic and electromagnetic shield 24 but maintained under the influence of the polarizing field in order to maintain the "in phase" relationship of the precessing electrons. Within the spin-spin relaxation time $T_2$, the precessing electrons are brought under the influence of a series resonant circuit 25 tuned to 49 megacycles, and consisting of induction coil 26, tunable condenser 27 and load resistance 28 which will release some of the energy of the precessing electrons in the load resistance 28 in the form of heat. The resonant circuit 25 will oscillate by induction produced by the many "in phase" precessing charged electrons and the flow of the electric current in the external circuit 25 will cause a counter field which will decelerate the precessional electron movement. The decrease in the internal kinetic energy will cause a lowering of temperature of the solution and an insulation 29 is applied to the tubing carrying the cold solution to a heat exchanger of the usual design so that practical use can be made of the refrigeration produced. In accordance with the first and second laws of thermodynamics, energy is supplied by generator 13, heat is rejected in the cooling jacket 23 and in the load resistance 28 and heat energy is supplied to the refrigeration cycle when as heat is absorbed from the space to be refrigerated by the cold refrigerant.

The form of the invention in Figure 2 accomplishes the same end result as the first described form of the invention. In the present example, a non-flowing mass of sodium in liquid ammonia solution 30 is utilized. An intermittent flow of cooling both 31 and refrigerant 32 through the jacket 33 which surrounds the sodium and liquid ammonia solution 30 is alternately used for the heat rejection and heat absorption phases of the cycle. The flow of the liquid through the common jacket is controlled by electric valves 34a, 34b, 35a and 35b which are properly energized and deenergized by switch elements 36a and 36b of ganged switch 36. With the switch 36 in the "up" position, switch section 36a opens valves 34a and 34b and switch section 36b closes valves 35a and 35b so that the cooling bath can flow through the heat transfer jacket 33. The wiring of the control circuits is conventional and is not shown so as not to confuse the true aspects of the invention. Also switch section 36c applies a high frequency voltage of 49 mc. from generator 37 to the parallel resonant circuit consisting of coil 38 surrounding solution 30 and tunable condenser 39, the circuit being tuned for resonance at 49 mc. The applied R. F. field of coil 38 is at right angles to the polarizing magnetic field produced by electromagnet 40, the electromagnet being energized and modulated in the manner of Figure 1. In the influence of both fields the sodium and liquid ammonia solution 30 will absorb R. F. energy under the condition of resonance of the precessing electron spins. The absorbed energy will be removed by the cooling bath 31 and jacket 33 so as to maintian an approximate isothermal process. During this isothermal process a large quantity of spinning electrons are forced into an "in phase" relationship with respect to the orbit of the precessional movement. The high frequency energy is applied for a length of time greater than the spin-lattice relaxation time $T_1$ to permit thermal equilibrium. Switch 36 is then changed to the "down" position and in this position, switch section 36a closes valves 34a and 34b while switch section 36b opens valves 35a and 35b so that the cooling bath 31 is stopped and the flow of refrigerant 32 is permitted through the jacket 33. Also switch section 36c disconnects the resonant circuit from the generator 37 while switch section 36d connects coil 38, condenser 39 and load resistance 41 into a series resonant circuit. The action of this series resonant circuit under the influence of many spinning electrons precessing "in phase" will cause an oscillating current to flow through the load resistance 41 and a counter field will be produced to decelerate the precessing electrons. As the kinetic energy is removed in the form of heat in load resistance 41, the temperature of the sodium and liquid ammonia solution 30 will be reduced and this refrigeration is transferred to the refrigerant 32 by means of jacket 33. The refrigeration of the sodium and liquid ammonia solution will proceed for a length of time approximately equal to the spin-spin relaxation time $T_2$. After this length of time, switch 36 can be changed in position to start another heat rejection cycle.

Figure 3 is an alternate arrangement of that part of the invention having to do with the flow of the sodium and liquid ammonia solution and the flow of the cooling bath while using the same basis electrical circuitry of Figure 2. In this example of the invention, the sodium and liquid ammonia solution 30 has intermittent flow through the magnetic fields and the refrigeration is transferred from the sodium and liquid ammonia solution in another heat exchanger which is not positioned in the magnetic fields. Before the aligning cycle occurs, electrically controlled valve 42 is opened while valve 43 is closed so that a mass of sodium and liquid ammonia solution is positioned in the magnetic fields. During the aligning phase, valve 44 is opened to allow the flow of cooling bath 45 through jacket 46. At the end of the aligning cycle, valve 44 is closed so that the jacket 46 can drain by gravity. At the end of the refrigeration cycle, valve 43 is opened so that the cold sodium and liquid ammonia solution can be flowed to an external heat exchanger in order to transfer the refrigeration for practical use. Valve 43 is closed after the sodium and liquid ammonia solution is removed from the magnetic fields. The cycle is then repeated. The details of Figure 3 which are omitted as similar to the corresponding details of Figure 2.

In Figure 4, a resonance circuit 50 is disclosed which corresponds with either of the previously described resonance circuits 25 of Figure 1 or resonance circuit made up of coil 38, condenser 39 and resistance 41 of Figure 2. The circuit 50 includes an induction coil 51 and a condenser 52, but instead of a resistance 28 or 41, the circuit is provided with a suitable means for expending a portion of the energy given up by the refrigeration cycle in useful loads. A transformer 53 and an electro mechanical device 54 is shown connected in the circuit 50 for absorbing energy normally wasted as heat. It is obvious that if desired, the heat given up by the resistances 28 and 41 may be usefully employed for practical heating purposes.

It is to be understood that various modifications of the invention other than those described may be effected by persons skilled in the art without departing from the principle and scope of the invention as defined in the appended claims.

For instance, variations such as employing cavities for the resonant circuits, employing other frequencies, employing other field strengths, employing other chemical compositions and other concentrations of the solution, employing gaseous and solid states for the medium to be cooled, employing nuclear or other atomic particles having knietic energy for the absorption and emission of energy, employing other sources of magnetism for the polarized field, employing other physical arrangements of equipments and apparatus are all within the spirit and scope of this invention.

What is claimed is:

1. An energy converter comprising a medium, a magnet having a polarizing field in proximity to the said medium, means for selectively providing an alternating electromagnetic field through the said medium in a direction which is perpendicular to the polarizing field produced by the said magnet, means for removing generated heat from said medium, a resonant circuit having an energy dissipating element, means for selectively coupling the said resonant circuit to said medium, whereby the medium is cooled when the influence of the said alternating electromagnetic field is removed from the said medium and the influence of the said resonant circuit is established upon the medium.

2. An energy converter as claimed in claim 1 wherein the medium is of the class having free electrons.

3. An energy converter as claimed in claim 1 wherein the medium is a liquid ammonia solution of an alkali metal.

4. An energy converter as claimed in claim 1 wherein the medium is a liquid methylamine solution of potassium metal.

5. An energy converter as claimed in claim 1 wherein there is provided an alternating current source and a winding disposed on said magnet, said winding being connected across said alternating current source.

6. An energy converter as claimed in claim 1 wherein there is provided a D. C. current source and the said magnet has a winding, said winding being inductively disposed on said magnet and said winding being connected across said D. C. source, whereby said magnet is an electromagnet.

7. An energy converter as claimed in claim 1 wherein the said means for selectively providing an alternating electromagnetic field through the medium includes means for flowing said medium away from the alternating electromagnetic field and the said means for selectively coupling said resonant circuit to said medium includes means for flowing said medium into the proximity of said resonant circuit.

8. An energy converter as claimed in claim 1 wherein the said means for selectively providing an alternating electromagnetic field includes a high frequency signal source and a tank circuit having a coil and a condenser, said coil being connected across said condenser, said tank circuit being connected across said high frequency signal source, said coil being disposed in proximity to said medium and said coil having its axis in perpendicular relationship to the polarizing field of said magnet.

9. An energy converter as claimed in claim 1 wherein the said resonant circuit is a series circuit having a coil, a condenser and the said energy dissipating element, said coil being disposed in proximity to the said medium and said coil having its axis in parallel relationship to the alternating electromagnetic field of the said means for selectively providing an alternating electromagnetic field.

10. An energy converter as claimed in claim 1 wherein the said means for removing generated heat within said medium is a heat exchanger.

11. The method of cooling a medium comprising the steps of subjecting the said medium simultaneously to two perpendicular fields, one field being a polarizing field and the other field being an alternating electromagnetic field, adjusting the two fields so that a state of paramagnetic resonance is established within the medium, removing a portion of the generated heat within the said medium by heat exchange, removing the influence of the alternating electromagnetic field, removing some of the internal energy within the medium by electromagnetic induction before the state of paramagnetic resonance within the medium is destroyed and dissipating the energy which was removed by the electromagnetic induction.

12. The method of cooling a medium as claimed in claim 10 wherein the said medium is of a class having free electrons.

References Cited in the file of this patent

UNITED STATES PATENTS

| | | |
|---|---|---|
| Re. 23,769 | Varian | Jan. 12, 1954 |
| 2,561,489 | Bloch et al. | July 24, 1951 |
| 2,589,494 | Hershberger | Mar. 18, 1952 |
| 2,589,775 | Chilowsky | Mar. 18, 1952 |